United States Patent [19]
Erickson et al.

[11] 4,227,865
[45] Oct. 14, 1980

[54] CONSTANT FLUID FILM THICKNESS HYDROSTATIC THRUST BEARING

[75] Inventors: John W. Erickson, Huntington Beach; John M. Kelleher, La Palma, both of Calif.

[73] Assignee: Kobe, Inc., City of Commerce, Calif.

[21] Appl. No.: 33,773

[22] Filed: Apr. 27, 1979

[51] Int. Cl.³ .................... F04B 47/08; F04B 47/14
[52] U.S. Cl. .................... 417/365; 417/408; 415/104
[58] Field of Search .......... 417/365, 408, 53; 415/104, 107, 106

[56] References Cited
U.S. PATENT DOCUMENTS

| | | | |
|---|---|---|---|
| 3,087,434 | 4/1963 | Reichenbacher | 417/408 X |
| 3,171,630 | 3/1965 | Harney et al. | 415/104 X |
| 3,847,512 | 11/1974 | Brown et al. | 417/365 |
| 4,082,482 | 4/1978 | Erickson et al. | 417/408 |

*Primary Examiner*—Richard E. Gluck
*Attorney, Agent, or Firm*—William C. Norvell, Jr.

[57] ABSTRACT

A method and apparatus are provided for automatically and continuously balancing the unbalanced thrust resulting from the operation of a fluid pump which is driven by a fluid pressure motor. A hydrostatic-type thrust bearing is employed on the common shaft of the fluid pump and motor by applying pressures to opposite sides of the circular flange of such hydrostatic thrust bearing to compensate for any unbalance in thrust occuring during operation of the pump without requiring any axial movement of the hydrostatic thrust bearing flange. Because of the lack of flange movement, the thrust bearing operates with a constant fluid film thickness.

9 Claims, 1 Drawing Figure

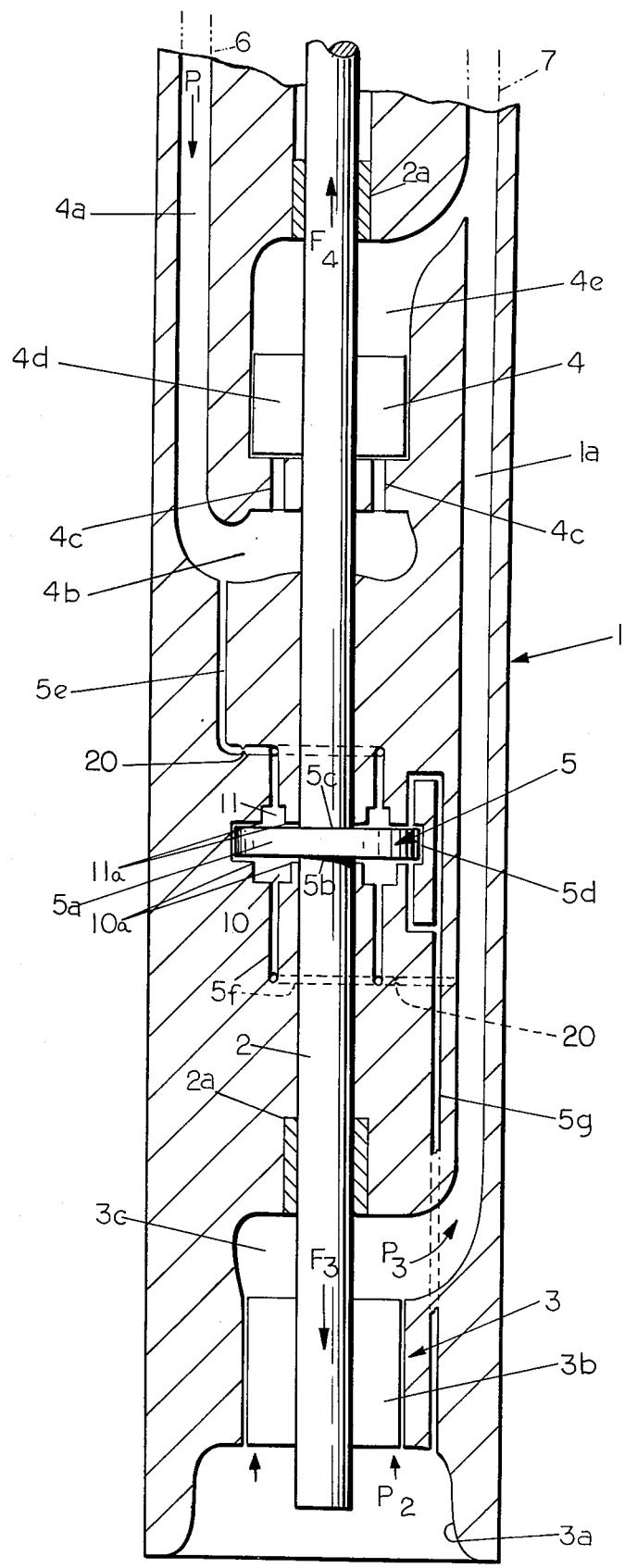

CONSTANT FLUID FILM THICKNESS HYDROSTATIC THRUST BEARING

BACKGROUND OF THE INVENTION

1. Field of the Invention

The invention relates to a method and apparatus for automatically and continuously balancing the opposing thrust forces that are inherently generated in the operation of, for example, a turbine-driven, oil well pump. Such units are commonly supported at the bottom of a well by a tubing string and the thrust forces generated by the pumping portion of the unit in a downward direction generally are significantly larger than the oppositely directed thrust forces generated by the operation of the turbine which drives the pump. The balancing of the excess downward thrust force is very desirable since the thrust capacity of any conventional bearings that could be employed in the unit is severely limited by the diametrical constraints of the oil well casing within which the pump is disposed. Additionally, an unbalanced downward thrust load of any appreciable magnitude would affect the size of the tubing string required for suspending the turbine-driven, pumping unit within the well.

2. Description of the Prior Art

Thrust bearings have heretofore been employed in turbo-driven pumps for oil wells which are of the hydrostatic type. Such bearings essentially comprise a circular flange connected to the pump shaft and have annular chambers disposed on opposite sides of the circular flange and respectively connected to pressure sources. The lips of the annular chambers are disposed in close proximity to the adjacent rotating face of the flange and the effective pressure exerted by each annular chamber on the flange is a function of the axial spacing of the flange relative to such lips. The shaft and flange can move axially to a limited extent. Hence, if the flange is moved with the pump shaft as a result of an unbalance of the thrust forces between the pump and turbine, it will move closer to lips of one annular chamber and farther from the lips of the annular chamber disposed on the opposite side of the annular flange. This results in an increase in effective pressure on the side of the flange moving closer to a chamber, and a decrease in effective pressure of the chamber on the opposite side of the flange from which it is moving away. This action thus results in a pressure force operating on the one side of the flange to return it (and the attached shaft) to its normal position where it is approximately centered between the lips of the annular chambers respectively disposed on its opposite sides.

This prior art system for compensating for thrust imbalance in a fluid driven oil well pump has the disadvantage that whenever the thrust imbalance becomes severe, for example, when the gas content of the fluid being pumped increases suddenly, the gap between the lips of the annular chamber toward which the thrust flange moves as a result of the imbalance becomes so narrow that contact occurs and the thrust bearing is effectively destroyed.

U.S. Pat. No. 3,847,512 discloses the utilization of balancing forces for application to opposite sides of a piston.

SUMMARY OF THE INVENTION

Accordingly, it is an object of this invention to provide a thrust balancing system for a fluid driven pump employed in oil wells wherein opposing fluid pressure forces are imposed on opposite sides of a circular flange of a hydrostatic thrust bearing, which is secured to the driving shaft of the pump unit, and the net pressure force is always respectively equal to, but opposed to, the net of the thrust forces being generated respectively by the fluid motor portion and the pump portion of the unit so that no movement of the thrust balancing flange is required to effect a balancing of the thrust forces on the pump shaft.

The invention contemplates simulating the thrust forces that occur in the turbine portion and the pump portion of a turbo-pump by pressure forces which are respectively applied to opposite sides of a thrust bearing flange mounted on the turbo-pump shaft so that there is never an uncompensated unbalance in thrust on the pump, bearing and turbine unit. Such forces are inherently always in balance and no axial movement of the pump shaft and the thrust bearing flange mounted thereon is required. There is no possibility of eliminating the fluid films between the thrust bearing flange and the lips of the pressure chambers cooperating therewith by excess axial displacement of the thrust flange.

In particular, the annular fluid pressure chambers respectively provided on opposite sides of the thrust bearing flange have their effective areas and their pressure differences proportioned such that any transition in thrust forces of the pump or turbine will result in an equal and opposite net force on the thrust bearing flange without requiring any axial motion of the thrust bearing flange.

BRIEF DESCRIPTION OF THE SINGLE DRAWING

The single FIGURE constitutes a schematic sectional view of a turbo-pumping apparatus embodying this invention.

DESCRIPTION OF THE PREFERRED EMBODIMENTS

Referring to the drawing, numeral 1 represents the housing of a turbo-pump of the type employed in oil wells. Within such housing, an axial shaft 2 is journaled by suitable journal bearings 2a and, on the lower end of such shaft, a pump unit 3 is secured thereto, while at the upper end of the shaft, a fluid driven turbine 4 is secured to the shaft. Intermediate the pump 3 and turbine 4 there is provided a hydrostatic-type thrust bearing 5 which is modified in accordance with the invention to provide a continuous and automatic balancing of the unbalanced thrust forces F3 and F4 respectively produced on the shaft 2 by the operation of the pump 3 and turbine 4.

Turbine 4 is driven by relatively high pressure fluid P1 supplied from the top of the well in conventional fashion through a tubing string 6 and conduit 4a. The turbine 4 can be of the axial flow type, including an annular header 4b, a plurality of axially extending, circularly spaced nozzles 4c and a plurality of turbine blades 4d secured to the shaft 2 and rotated by the pressured fluid P1 supplied through the conduit 4a. The exhaust fluid from the turbine pump 4 passes through an annular chamber 4e into an axially extending conduit 1a, which also carries the pressurized fluid P3 being pumped out of the well by the pumping unit 3, and then into a tubing string 7.

Pumping unit 3 can comprise any form of pump but is here shown as being an axial flow turbine-pump having an inlet chamber 3a communicating with blades 3b secured to the shaft 2 and generating a pressure P3 in an annular output chamber 3c which is connected to the top of the well by the conduit 1a and the tubing string 7.

Thrust forces are inherently produced in the operation of the fluid driven turbine 4 and the shaft driven pump 3. The thrust F3 produced by pump 3 is in a downward direction relative to the well hole while the thrust force F4 produced by the turbine 4 is in an upward direction. These thrust forces are automatically and continuously balanced through appropriate pressures P1 and P3 respectively applied to properly proportioned areas on the opposite faces 5b and 5c of a hydrostatic thrust bearing flange 5a.

It will be noted that the high pressure P1 of the power fluid supplied to the turbine is applied through a suitable conduit 5e to an annular chamber 11 which is disposed opposite the upper face 5c of the thrust bearing flange 5 and defines annular, radially spaced lips 11a which are disposed in close proximity, but not in contact with, such face. The pumping pressure P3 generated by pump 3 is applied through a suitable conduit 5f to an annular chamber 10 disposed on the lower side 5b of the thrust bearing flange 5 and having annular, radially spaced lips 10a disposed in close proximity to, but not in contact with, such face. The chamber 5d within which the thrust bearing flange 5a is rotating is connected by suitable conduits 5g to the pressure P2 existing at the inlet side of the pump 3, this constituting the suction pressure of the pump. This pressure is obviously significantly lower than either the pressures P1 or P3. Pressures P1 and P3 obviously are respectively directly proportional to the thrust forces F4 and F3.

Constricting orifices 20 are respectively provided in the conduits 5e and 5f to effectively reduce the pressures P1 and P3 applied to the opposite sides of the thrust flange 5 to essentially one-half of the actual pressures. Correspondingly, the effective areas of the thrust bearing flange 5a which are respectively affected by the pressures contained in the annular chambers 10 and 11 are proportioned to be twice the area that would be required if full value of pressures P1 and P3 were applied thereto. The relationship of the effective pressure forces respectively exerted on opposite sides of the flange 5a are equal and opposite to the thrust forces respectively generated by the driving turbine 4 and the pump 3. As a result, the described construction provides an inherently balanced hydrostatic system that has a spring characteristic imparted to it because of the throttling action of the orifices 20.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An apparatus for automatically and continuously balancing the thrust forces generated by a pump driven by a fluid motor, comprising: a hydrostatic thrust bearing disposed on a shaft connecting the fluid motor and the pump, said thrust bearing comprising: a circular flange secured to said shaft; a pair of annular chambers adjacent said flange; first conduit means connecting one annular chamber to the pressurized fluid output of said pump to oppose the thrust force of said pump; second conduit means connecting the other annular chamber to the pressurized fluid input to said fluid motor to oppose the thrust force of said fluid motor, the effective areas of said two annular chambers being respectively proportioned to the normal thrust forces respectively generated by said pump and motor, whereby the effective net force exerted by fluid pressures in said annular chamber on said circular flange continuously offsets any variation in thrust forces exerted on said shaft by said pump and said fluid motor.

2. The combination defined in claim 1 wherein said fluid motor comprises an axial flow turbine and said pump is an axial flow turbine type.

3. The combination defined in claim 1 wherein a housing surrounds said annular chambers and said circular flange, and a third conduit means connects the interior of said housing to the fluid pressure existing at the inlet end of said pump.

4. The apparatus defined in claims 1, 2, or 3 wherein pressure reduction means are respectively provided in each of said first and second conduit means.

5. The apparatus defined in claim 1 wherein the effective areas of each of said annular chambers relative to said thrust bearing flange is selected to provide a pressure force on one side of said thrust bearing flange simulating and opposing the thrust force generated by said pump and a pressure force on the other side of said thrust bearing flange simulating and opposing the thrust force generated by the operation of said fluid motor.

6. The combination defined in claim 5 wherein a housing surrounds said annular chambers and said circular bearing flange, and a third conduit means connects the interior of said housing to the fluid pressure existing at the inlet end of said pump.

7. The apparatus defined in claims 5 or 6 wherein pressure reduction means are respectively provided in each of said first and second conduit means.

8. The method for automatically and continuously balancing the thrust forces generated by a pump driven by a fluid motor and having a hydrostatic thrust bearing flange disposed on a shaft connecting the fluid motor and the pump, comprising the steps of: (1) applying to the pump side of a hydrostatic bearing flange a pressure from the pump which is proportional to the fluid pressure as generated by the pump and is applied to an area selected so that the resulting force on the flange simulates and opposes the thrust force of the pump; and (2) applying a second fluid pressure from upstream of the motor to the motor side of the circular flange of the hydrostatic fluid bearing which is proportional to the fluid pressure driving said motor and is applied to an area selected so that the resulting force on the flange simulates and opposes the thrust force produced by the operation of the fluid motor.

9. The method for automatically and continuously balancing the thrust forces generated by a pump driven by a fluid motor and having a hydrostatic thrust bearing flange disposed on a shaft connecting the fluid motor and the pump, comprising the steps of: (1) applying to the hydrostatic bearing flange a net fluid pressure force from the pump which is proportional to the net fluid pressure as generated by the pump so that the resulting force on the flange simulates and opposes the thrust force of the pump; and (2) applying a second net fluid pressure force from upstream of the motor to the hydrostatic bearing flange which is proportional to the net fluid pressure as generated by the fluid motor so that the resulting force on the flange simulates and opposes the thrust force of the fluid motor.

* * * * *